US012395254B2

(12) United States Patent
Cumin et al.

(10) Patent No.: US 12,395,254 B2
(45) Date of Patent: Aug. 19, 2025

(54) METHOD AND DEVICE FOR CHECKING THE OPERATION OF AN ELECTRONIC DEVICE

(71) Applicant: Orange, Issy-les-Moulineaux (FR)

(72) Inventors: Julien Cumin, Chatillon (FR); Kévin L'Hereec, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 98 days.

(21) Appl. No.: 17/846,536

(22) Filed: Jun. 22, 2022

(65) Prior Publication Data

US 2022/0416914 A1 Dec. 29, 2022

(30) Foreign Application Priority Data

Jun. 23, 2021 (FR) ........................................ 2106659

(51) Int. Cl.
*H04B 3/46* (2015.01)
*H04B 17/17* (2015.01)
*H04B 17/26* (2015.01)

(52) U.S. Cl.
CPC ............. *H04B 17/17* (2015.01); *H04B 17/26* (2015.01)

(58) Field of Classification Search
CPC ................................. H04B 17/17; H04B 17/26
USPC .................................. 375/224, 219, 295, 316
See application file for complete search history.

(56) References Cited

U.S. PATENT DOCUMENTS

| 2012/0157007 | A1 | 6/2012 | Yoneyama et al. |
| 2014/0195668 | A1* | 7/2014 | Selvakumar ........... H04L 41/147 709/224 |
| 2015/0133062 | A1* | 5/2015 | Mrvaljevic ............ H04W 24/00 455/67.13 |
| 2023/0412453 | A1* | 12/2023 | Hasegawa ............ H04L 41/0677 |

FOREIGN PATENT DOCUMENTS

KR 101974347 B1 9/2019

OTHER PUBLICATIONS

French Search Report and Written Opinion dated Mar. 8, 2022 for corresponding French Application No. 2106659, filed Jun. 23, 2021.
English translation of Written Opinion of the French Searching Authority dated Mar. 8, 2022 for corresponding French Application No. 2106659, filed Jun. 23, 2021.

* cited by examiner

*Primary Examiner* — Zewdu A Kassa
(74) *Attorney, Agent, or Firm* — David D. Brush; Westman, Champlin & Koehler, P.A.

(57) ABSTRACT

A method for checking the operation of an electronic device configured to transmit signals via a radio communication channel is implemented by a checking device. The method includes: receiving, on the radio communication channel, a signal from the electronic device; and determining the operation of the electronic device based on noise present in the received signal.

20 Claims, 2 Drawing Sheets

METHOD AND DEVICE FOR CHECKING THE OPERATION OF AN ELECTRONIC DEVICE

CROSS-REFERENCE TO RELATED APPLICATIONS

This Application claims priority benefit to French Application No. FR 2106659, filed Jun. 23, 2021, the content of which is incorporated herein by reference in its entirety.

FIELD OF THE DISCLOSURE

The present invention relates to a method for checking the operation of an electronic device.

It also relates to a checking device for checking the operation of an electronic device implementing this checking method.

The invention is applicable to any electronic device configured to transmit messages using a radio technology, such as Wi-Fi, ZWave, LoRa, Bluetooth, DECT-ULE, etc.

BACKGROUND OF THE DISCLOSURE

It is important to check the correct operation of objects connected to a network, these objects possibly exhibiting malfunctions, such as software or hardware malfunctions, power supply problems or malicious attacks.

One known mechanism for checking the operation of objects in a network is that of analyzing the content of messages transmitted by the object. Indeed, the content of the messages transmitted by an object may be inconsistent when the object exhibits a malfunction.

However, many malfunctions do not impact the content of the transmitted messages, and these mechanisms are therefore of no use for identifying objects exhibiting one of the malfunctions of these types.

For example, some components not critical to the operation of an object may malfunction without impacting the messages transmitted by the object in the short term. However, the malfunctioning of these components may, in the long term, lead to the malfunctioning of other components critical to the operation of the object, or to the malfunctioning of the object itself.

According to another example, objects powered by batteries or by electrical cells may continue to operate normally (without modifying the content of the transmitted messages), even though the level of charge of the electric power supply device is low.

Some objects are configured to provide information about some of these malfunctions by sending specific messages. For example, the object may be configured to transmit a message indicating the battery level of the object. However, this solution is not optimum since it involves additional energy consumption and communication channel congestion.

Furthermore, to identify some malfunctions, it is essential to add components dedicated for this purpose, these dedicated components themselves being able to malfunction.

SUMMARY

There is thus a need for an improved mechanism for checking the operation of objects connected in a communication network.

The present invention proposes to improve the situation by proposing a method for checking the operation of an object that makes it possible to reliably detect when the object exhibits a malfunction.

To this end, according to a first aspect, the invention targets a method for checking the operation of an electronic device configured to transmit signals via a radio communication channel.

According to the invention, the checking method is implemented by a checking device and comprises:

receiving, on the radio communication channel, a signal from the electronic device; and determining the operation of the electronic device based on the noise present in the received signal.

The checking device thus gives an indication about the operation of the electronic device based on the noise contained in the signals received from the electronic device.

It should be noted that the noise present in the signal transmitted by an electronic device is characteristic of the electronic device and gives an indication about the operation of the device, in particular whether it is operating correctly or whether it exhibits a malfunction. Indeed, during operation of an electronic device, the electronic circuits of the device generate electromagnetic emissions whose characteristics depend on the design of these electronic circuits and also on the operation of the device, that is to say the operation implemented by the device. The electromagnetic emissions of the electronic device are thus different depending on the operation implemented by the device or the operating mode of the device. These electromagnetic emissions induce noise in the signals transmitted by the electronic device.

The checking device receiving a signal checks or analyzes the noise present in the signal transmitted by the electronic device to determine whether the operation of the electronic device is correct or incorrect. The determination of the correct or incorrect operation of the electronic device is thus based on the result of this check or analysis of the noise. In other words, checking the noise present in the signal makes it possible to determine whether the electronic device is operating correctly or whether it exhibits a malfunction.

It should be noted that the checking method is applicable to checking the operation of at least one electronic device, that is to say to checking the operation of one or more electronic devices. The steps of the checking method are thus implemented for each electronic device whose operation is checked.

According to one feature, the checking method furthermore comprises generating information relating to the operation of the electronic device.

The generated information gives an indication about the determined correct or incorrect operation. The generated information thus depends on the noise contained in the signal received by the checking device, this signal having been transmitted by the electronic device.

This information may comprise a message indicating the correct operation of the object or the presence of a malfunction in the electronic device.

It is thus possible for example to inform a user, via the checking device, of the correct operation or of the malfunctioning of the electronic device by way of the generated message. Thus, in the event of malfunctioning of the electronic device, actions may be taken to identify and/or repair the malfunction.

According to one feature, determining the operation comprises checking the noise present in the received signal.

According to one feature, the noise is checked against a nominal noise associated with an operating mode of the electronic device, the signal received by the checking device corresponding to a signal that was transmitted by the electronic device operating in said operating mode.

The nominal noise present in a signal transmitted by the electronic device is determined beforehand, for example in the factory after the electronic device has been manufactured. In particular, the nominal noise associated with an operating mode corresponds to the noise generated by the electronic circuits of the electronic device when the electronic device is operating correctly (that is to say without exhibiting a malfunction) in this operating mode.

It should be noted that the noise due to electromagnetic emissions is different when the device is operating differently. The nominal noise may thus be different for various operating modes of the electronic device. Therefore, for a device operating in multiple operating modes, noises having different characteristics may be associated, respectively, with the various operating modes.

A device operates in an operating mode when it is configured to implement an operation. For example, if the electronic device is a storage or memory device, the noises generated by implementing a read operation and a write operation, respectively, are different. It is then considered that the device is operating in a first operating mode when it implements a read operation and in a second operating mode when it implements a write operation.

Indeed, the electronic device calls upon different electronic components when it is operating in different operating modes. The electronic device thus transmits messages (or signals) of a different category or type when it is operating, respectively, in different operating modes. It should be noted that the noise present in a signal transmitted by the electronic device corresponds to the noise generated by the components operating at the time when the message is transmitted.

Therefore, the nominal noise is determined beforehand for each operating mode of the electronic device. A set of nominal noises is thus determined for an electronic device, each nominal noise of the set corresponding to the nominal noise for an operating mode (or type of operation) of the electronic device. For example, these nominal noises may be given by electronic device manufacturers, for example in technical specifications.

It should be noted that, in some embodiments, determining the nominal noise corresponds to determining the nominal signal, this nominal signal containing the nominal noise.

Multiple types of measurement may be implemented to determine and quantify the noise present in a signal. These measurements are known to those skilled in the art and do not need to be described in detail here. For example, the noise may be quantified by determining the signal-to-noise ratio of the nominal signal, a spectrogram of the nominal signal, a list of harmonics present in the nominal signal, etc. According to another example, the nominal noise is quantified by determining the nominal signal, this signal containing the noise.

When, according to the result of the noise check, the noise present in the received signal is similar to the nominal noise associated with the current operating mode of the electronic device, the electronic device is operating correctly.

By contrast, if, according to the result of the noise check, the noise present in the received signal is different from the nominal noise associated with the current operating mode of the electronic device, the electronic device exhibits a malfunction.

According to one feature, checking the operation of the electronic device comprises comparing the noise present in the received signal and the nominal noise associated with the operating mode of the electronic device, the determination of the operation being based on the result of the comparison.

When comparing the noise present in the received signal, called current noise, with the nominal noise, at least one characteristic of the current and nominal noises is compared. For example, values of introduced frequencies or amplitude values may be compared.

According to one feature, comparing the noise comprises checking the similarity between the received signal and a nominal signal containing the nominal noise associated with the operating mode of the electronic device.

Checking the noise thus comprises measuring the similarity between the received signal containing the current noise and a nominal signal containing the nominal noise associated with the operating mode of the electronic device.

According to one embodiment, the noise present in the received signal is extracted and then compared with the nominal noise.

According to one feature, checking the similarity between the received signal and the nominal signal comprises implementing a similarity algorithm on said signals.

Implementing a similarity algorithm makes it possible to check whether the influence of the current noise on the received signal is similar to the influence of the nominal noise on the nominal signal. In other words, the noise present in a signal modifies the characteristics of this signal. Thus, by applying a similarity algorithm to the received (or current) and nominal signals, it is checked whether the influence of the current and nominal noises on the current and nominal signals, respectively, is similar or different. If the current noise modifies the current signal in a manner similar to how the nominal noise modifies the nominal signal, the electronic device is operating correctly. If not, the electronic device exhibits a malfunction.

According to one feature, the algorithm that is implemented is selected based on at least one characteristic of the nominal noise associated with an operating mode of the electronic device.

Depending on the operating mode of the electronic device, the noise in the transmitted signals is of a different kind, or in other words the message transmitted by the electronic device is of a different category or type. For example, if the signal transmission power is modified due to the noise induced by the electromagnetic emissions of the electronic circuits, one algorithm suitable for checking the power variations is a cross-correlation algorithm, preceded by a temporal realignment algorithm such as dynamic time warping (DTW). Thus, in this example, these algorithms are selected so as to check the similarity between the current signal and the nominal signal. Indeed, by applying such algorithms to the current and nominal signals, it is possible to check whether the power variation generated by the current noise is similar to the power variation generated by the nominal noise in the nominal signal. According to another example, during nominal operation of the device, the noise may induce a phase offset in the signal transmitted by the device. In this case, one appropriate algorithm may be a "sine-wave-fit" algorithm. In this case, this algorithm is selected to be applied to the current and nominal signals.

According to another feature, checking the noise present in the received signal comprises checking a characteristic of a noise representative of a malfunction of the electronic device.

The presence of a malfunction may thus be monitored by checking a noise induced by the malfunction, this noise having a known particular characteristic. Indeed, it is possible to look for the characteristic of the noise typical of a particular malfunction of the electronic device in order to determine whether the electronic device exhibits this particular malfunction.

For example, a type of malfunction may introduce a frequency of a predetermined value. Checking the noise thus comprises checking the value of the frequencies of the received signal (for example after spectral analysis of the received signal) in order to check whether the noise contains a frequency of predetermined value.

According to one feature, determining the operation of the electronic device comprises analyzing the spectrum of the received signal.

For example, the spectrum of the received signal may be used to determine whether the received signal contains a frequency having a predetermined value, the presence of this frequency having said predetermined value in the received signal being representative of a malfunction of the electronic device.

In other words, checking the noise present in the received signal comprises implementing spectral analysis on the received signal in order to detect whether a frequency of a predetermined value representative of a malfunction of the electronic device is present in the received signal.

The features of the checking method presented above may be taken alone or in combination with one another.

According to a second aspect, the present invention relates to a checking device configured to check the operation of an electronic device transmitting signals via a radio communication channel, the checking device comprising:
  a reception module configured to receive, on the radio communication channel, a signal from the electronic device; and
  a determination module configured to determine the operation of the electronic device based on the noise present in the received signal.

According to a third aspect, the present invention relates to an equipment configured to communicate with at least one electronic device via a radio communication channel. The equipment comprises a checking device according to the invention intended to check the operation of said at least one electronic device.

The equipment is thus configured to implement the method for checking the operation of said at least one electronic device. The equipment may be an access point to a network allowing the electronic device to access said network, for example a gateway.

In another embodiment, the equipment may be an electronic device, this electronic device being configured to communicate with at least one second electronic device and comprising the checking device according to the invention. The electronic device is thus intended to check the operation of said at least one second electronic equipment.

According to a fourth aspect, the present invention relates to an electronic device comprising a transmission module configured to transmit, via a radio communication channel, a signal to a checking device according to the invention.

According to one feature, the electronic device furthermore comprises a reception module configured to receive, from the checking device, an initiation command intended to initiate the checking of the operation of the electronic device, said signal being transmitted in response to the receipt of the initiation command.

According to a fifth aspect, the present invention relates to a system for checking the operation of at least one electronic device. The system comprises a set of electronic devices and a checking device according to the invention, this checking device being intended to check the operation of said at least one electronic device.

According to a sixth aspect, the present invention relates to a program for a checking device, comprising program code instructions intended to command the execution of the steps of the checking method according to the invention.

According to a seventh aspect, the present invention relates to an information medium able to be read by a processor in a checking device for checking the operation of at least one electronic device, on which the computer program according to the invention is recorded.

The checking device, the equipment, the electronic device, the checking system, the computer program and the medium have features and advantages analogous to those described above with reference to the checking method.

Other particular features and advantages of the invention will become more clearly apparent in the following description.

BRIEF DESCRIPTION OF THE DRAWINGS

In the appended drawings, which are given by way of non-limiting examples.

DETAILED DESCRIPTION OF ILLUSTRATIVE EMBODIMENTS

The proposed technique is applicable to any electronic device or object comprising modules needed to transmit messages using a radio technology. It is applicable in particular in the field of the "Internet of Things" (or IoT in the literature), in order to check the correct operation of objects, these objects very often being present in a large number and being of different kinds. A connected object is any electronic device or object configured to transmit or receive data via a communication network.

Figure 1:
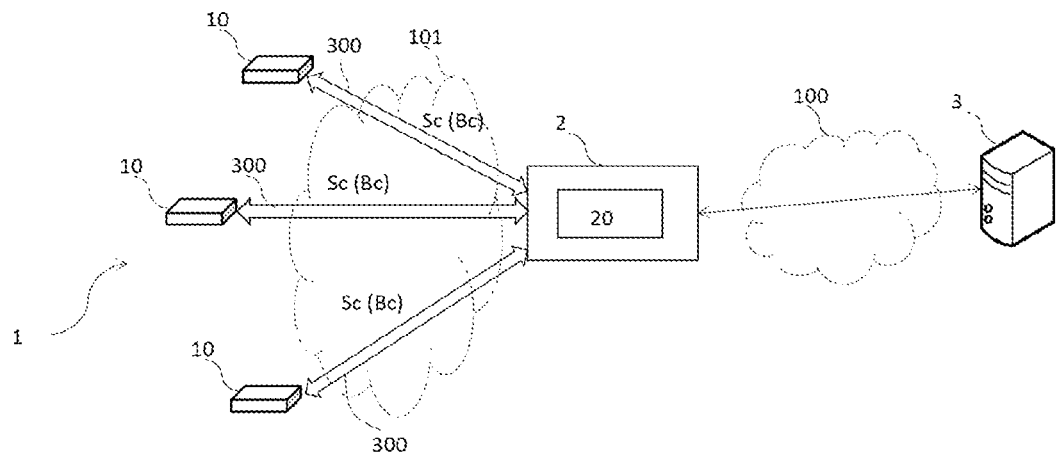
FIG. 1 shows the context in which the invention is applicable, according to one embodiment of the invention.

FIG. 1 shows a system able to implement one embodiment of the invention. In particular, FIG. 1 illustrates a set 1 of electronic devices or connected objects. The connected objects 10 may have various uses and may be used in varied contexts, such as the private life of users, in industry, in smart buildings or towns or the like. Some examples of connected objects are a mobile telephony terminal, a laptop computer, a tablet, a gateway, a printer, an audio speaker, a set-top box, a television set, a games console, a household appliance, a sensor, a camera, etc.

The connected objects 10 are furthermore configured to communicate with a checking device 20 via a radio communication channel, in accordance with at least one radio technology, such as Wi-Fi, ZWave, LoRa, Bluetooth, DECT-ULE, etc.

The checking device 20 will be described in more detail with reference to FIGS. 3a and 3b. It is configured to implement the proposed method for checking the operation of an electronic device or object 10. The checking method will be described in detail with reference to FIG. 2.

The objects 10 are furthermore configured to communicate with an access point device or gateway 2 allowing access to a wide area communications network 100 or WAN (for "wide area network") type network, such as the Internet. The set 1 of objects forms, with the gateway 2, a local area network 101 or LAN (for "local area network") type network, such as a home network or a company network.

The connected objects 10 and the gateway 2 are configured to exchange data with one another, at least through wireless communications, for example in accordance with a Wi-Fi (registered trademark) protocol.

It should be noted that, in the description, the terms object, connected object and electronic device are equivalent and represent one and the same equipment 10.

In the embodiment illustrated, the checking device 20 is integrated into the gateway 2. This embodiment makes it possible to centralize the checking of the set 1 of connected objects in one and the same equipment.

In other embodiments, the checking device is independent of the gateway. Furthermore, multiple checking devices may be present in the network formed by the objects and the gateway, each checking device taking responsibility for checking a subset of objects.

For example, the checking device may be integrated into one of the objects of the set of objects, this object thus being configured to check the operation of at least some of the objects 10 of the set 1 of objects. According to one embodiment, multiple objects may comprise a checking device, each object being configured to check the operation of a subset of objects. This embodiment allows decentralized implementation of the checking of the operation of the objects of the set. This embodiment may be useful when the number of objects is high and the distance between the objects is large. It may also be useful for some types of radio communication.

In other embodiments, the checking device may be independent of the network formed by the set of objects and the gateway, or be located in another equipment of the network.

For example, the checking device may be located in a server 3 of the wide area network 100 that the objects access via the gateway 2.

According to another example, the checking device may be an electronic device, such as a portable console, configured to establish a one-time radio connection with the object and check its operation. By way of completely non-limiting example, this portable console may be used by an operator or by a robotic arm to check the operation of the object, for example during inspections of a connected network object, be these periodic or one-time inspections, for example in the event of a malfunction detected in the network.

Regardless of the situation of the checking device, it is configured to implement the method for checking the operation of at least one object.

Figure 2:
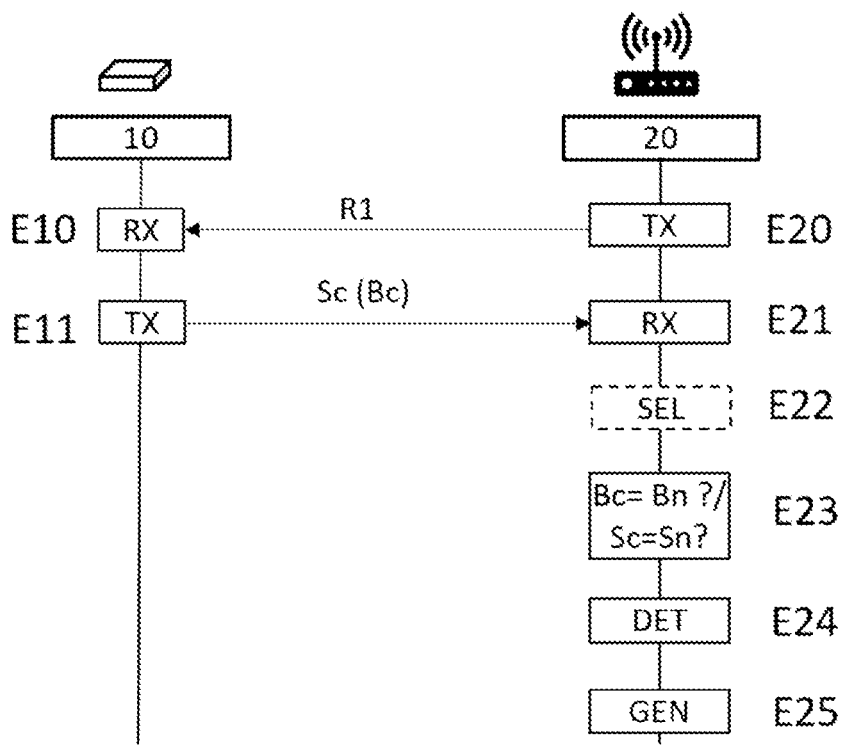
FIG. 2 illustrates steps of a method for checking the operation of an electronic device according to one embodiment of the invention.

FIG. 2 illustrates steps of the checking method according to one embodiment.

By virtue of implementing the method for checking the operation of an object, the checking device 20 determines whether the operation of the object 10 is correct or incorrect, thus being able to detect when the object exhibits a malfunction. As will be described in detail below, the operation of the object is checked by analyzing or checking the noise contained in a signal received by the checking device from the object.

The checking method thus comprises receiving E21, on a radio communication channel 300 (illustrated in FIG. 1) established between the object 10 and the checking device 101, a signal Sc from the object 10. The signal Sc represents a data flow or message.

The received signal Sc is thus transmitted E11 by the object 10. According to one embodiment, the signal transmitted by the object 10 is a signal dedicated to checking the operation of the object. According to another embodiment, the transmitted signal is a signal containing a data flow intended for example for another object of the set or for an equipment in another network, such as a server 3 of the wide area network 100. In this last embodiment, the checking device uses any type of message received from the object to check its operation.

In one embodiment, when the received signal is a signal dedicated to checking the operation of the object, the checking device transmits E20 an initiation request or command R1 intended for one or more objects 10 of the set 1 in order to initiate the checking of their operation.

The object 10 receiving E10 such an initiation request or command R1 generates a signal Sc and sends it E11 to the checking device 20.

For example, the checking device may be configured to transmit an initiation message or command periodically, or when it detects a particular event.

Once the checking device 20 has received E21 a signal Sc from the object 10, it determines the operation of the object, that is to say it determines whether the object is operating correctly or exhibits a malfunction.

As described above, the received signal Sc may be a signal dedicated to checking the object 10 or be any other type of signal received from the object 10.

To determine the correct or incorrect operation of the object, the checking device 20 analyzes the noise Bc present in the received signal Sc, also called current signal Sc. The noise present in the received signal Sc is called current noise Bc.

To analyze the current noise or noise present in the received signal, the checking device 20 checks E23 the noise present in the received signal Sc.

According to one embodiment, the noise is checked against a nominal noise associated with an operating mode of the object.

The noise present in the signals transmitted by the object may be different depending on the operating mode of the object, that is to say depending on the operation implemented by the object. The noise associated with the operating modes of the object is measured before the method is implemented, for example in the factory after the object has been manufactured.

In order to implement the noise check, the checking device has access to the nominal noises predetermined, respectively, for the operating modes of the object. This set of nominal noises may be stored in memory devices integrated into the object or into another equipment. This equipment may be for example a server 3 to which the checking device has access, or the checked connected object.

In one embodiment, to determine the operation of the object, the noise checking E23 device compares the current noise (noise present in said received signal Sc) and the nominal noise associated with the operating mode of the object. The operating mode of the object corresponds to the operating mode of the object at the time of transmission of the message intended for the checking device 20.

Based on the result of this comparison, the checking device determines E24 whether the object is operating correctly or whether it exhibits a malfunction.

In one embodiment, the current and nominal noises are compared by checking the similarity between said received signal Sc and a nominal signal Sn containing the nominal noise Bn associated with the operating mode of the object.

A nominal signal is a signal transmitted by the object operating correctly in an operating mode, the nominal noise being added to the nominal signal. Thus, for each object 10, a nominal signal Sn and a nominal noise Bn are associated with each operating mode of the object 10.

In one embodiment, the similarity check is implemented by applying a signal similarity algorithm to the current and nominal signals. A signal similarity algorithm compares characteristics of the signals under comparison.

If, according to the similarity check on the current and nominal signals, or equivalently on the current and nominal noises, the current noise is different from the nominal noise, the checking device 20 determines E24 that the object exhibits a malfunction.

By contrast, if the current noise is similar to the nominal noise, the checking device 20 determines E24 that the object is operating correctly.

In another embodiment, the similarity check is implemented by applying a similarity algorithm to the current and nominal noises extracted beforehand from the current and nominal signals, respectively.

Various algorithms may be used to measure the similarity of the signals. The algorithm that is implemented may be selected based on at least one characteristic of the nominal noise associated with the operating mode of the object.

According to one embodiment, the checking device is configured to select E22 based on a characteristic of the nominal noise associated with the operating mode of the object. In this embodiment, multiple algorithms may be used for one and the same object. For example, different algorithms may be used depending on the operating mode of the object. For example, a list associates an operating mode of the object with an algorithm to be used to check the operation of the object operating in this operating mode. By consulting this list, the checking device is able to ascertain the appropriate algorithm to be used to check the operation of the object for each operating mode of the object. Indeed, since the noise generated by the object may have different characteristics depending on the operating mode of the object, some algorithms may be more suitable than others for checking the noise in the signal received by the checking device. This list may be stored in storage (memory) devices internal or external to the checking device.

According to another embodiment, the checking device may be configured to select the similarity algorithm based on the object whose operation it checks. For example, a list may associate, with each object 10 of the set 1 of objects, an algorithm to be used to check its operation. The checking device may thus consult this list (which may be stored in a storage device internal or external to the checking device) to select the algorithm most suitable for checking the operation of an object.

According to one embodiment, determining the operation of the object comprises analyzing the spectrum of the received signal followed by measuring the similarity of the spectra of the current and nominal signals.

Whether the algorithm is selected by the checking device itself or by the designer of the checking device, the algorithm is selected based on the characteristics of the noise specific to the object and therefore of the noise that the checking device seeks to identify in order to determine whether the object is operating correctly or whether it exhibits a malfunction.

For example, if the noise present in the signal introduces high-frequency harmonics, the algorithm that is used is designed to detect the presence of these harmonics in order to determine whether the operation is correct or incorrect.

For example, the algorithm may be applied to the spectral analyses of the nominal noise and the current noise in order to measure the difference between these spectra. In practice, according to this algorithm, a Fourier transform is applied to the current and nominal noises in order to obtain the spectra associated, respectively, with the current and nominal noises. Next, a filter is applied to the obtained spectra, such as a low-pass filter, in order to extract the high frequencies from the spectra corresponding to the current and nominal signals. If the frequencies of the two spectra are similar, the noise present in the current signal is similar to the noise present in the nominal signal, the checking device determining E24 that the object is operating correctly.

If by contrast the frequencies of the nominal noise are not found in the current noise, the checking device determines E24 that the object exhibits a malfunction.

In another example, if the noise present in the nominal signal modifies the transmitted power of the transmitted signal, the algorithm may be designed to determine transmission powers of the nominal and current signals, followed by a comparison of these transmission powers.

In another example, if the nominal noise generates a time shift in the nominal signal, an algorithm designed to measure time series such as a "dynamic time warping" (DTW) algorithm may be used.

The application of these algorithms is known to those skilled in the art and does not need to be described in more detail.

According to one embodiment, checking the noise present in the received signal Sc comprises checking a characteristic of a noise representative of a malfunction of said electronic device.

For example, if, in the preliminary analysis of the object, it is determined that a malfunction of the object induces a high-frequency peak, checking the noise present in the received signal or current signal Sc comprises checking whether this high-frequency peak is present in the current signal Sc. Indeed, some common malfunctions (for example an incorrectly operating memory component) cause a characteristic high-frequency peak able to be identified beforehand in the factory.

If the high-frequency peak is present, the checking device 20 determines that the connected object exhibits a malfunction. By contrast, if the high-frequency peak is not present, the checking device 20 determines that the connected object is operating correctly.

The presence of the high-frequency peak may be checked through spectral analysis of the current signal Sc.

The checking method may furthermore comprise generating E25 information relating to the operation of the determined electronic device.

This information may comprise a message indicating the correct operation of the object or the presence of a malfunction in the object.

In one embodiment, the generated information relating to the operation of the object may be sent to an equipment monitoring the connected object, for example a communication terminal of a user or of an operator, or a server such as an application server.

One and the same equipment gathering information relating to the operation of the set of objects may be very useful for monitoring the correct operation of the objects.

Figure 3A:
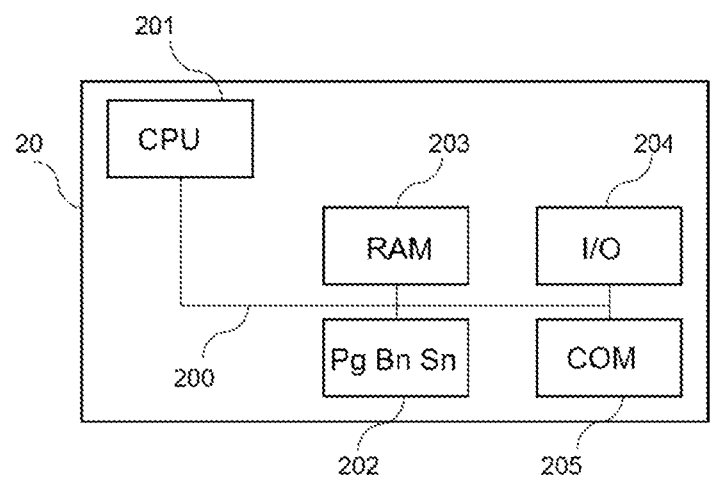
FIG. 3a illustrates a hardware architecture able to implement the proposed checking method.
Figure 3B:
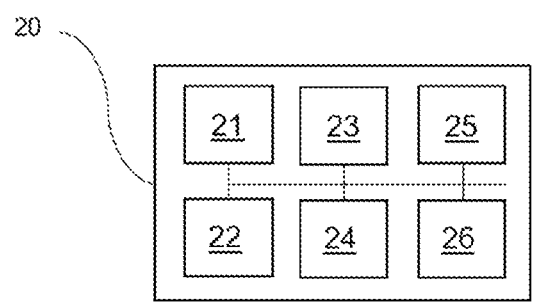
FIG. 3b is a functional depiction of a checking device according to one embodiment.

FIG. 3*a* schematically illustrates a hardware architecture of a checking device able to implement the proposed method for checking the operation of an electronic device.

The checking device 20 comprises a communication bus 200 to which the following are connected:
- a processing unit 201, called CPU (for "central processing unit") in the figure and possibly comprising one or more processors;
- a non-volatile memory 202, for example a ROM (for "read-only memory"), an EEPROM (for "electrically erasable programmable read-only memory") or a flash memory;
- a random access memory 203 or RAM;
- an input/output interface 204, called I/O in the figure, for example keys or buttons, a screen, a keypad, a mouse or another pointing device such as a touchscreen or a remote controller allowing a user to interact with the equipment 2 via a graphical interface or a human-machine interface; and
- a communication interface 205, called COM in the figure, designed to exchange data for example with the electronic devices 10 or with a server 3 via a communication network 100.

The random access memory 203 contains registers designed to record variables and parameters that are created and modified during the execution of a computer program comprising instructions for implementing the proposed checking method. The instruction codes of the program stored in the non-volatile memory 202 are loaded into the RAM memory 203 in order to be executed by the processing unit CPU 201.

The non-volatile memory 202 is for example a rewritable EEPROM memory or flash memory able to constitute a medium within the meaning of the invention, that is to say able to comprise a computer program comprising instructions for implementing the proposed checking method. The rewritable memory may comprise for example predetermined nominal signals and/or nominal noises for the operating modes of each connected object 10 of the set 1 of objects. These data are updated as connected objects are added or removed.

This program, by way of its instructions, defines functional modules of the checking device that are implemented and/or control the hardware elements described above. FIG. 3b is a functional depiction of an equipment according to one embodiment.

These modules comprise in particular:
- a reception module 21 configured to receive, on said radio communication channel, a signal (representative of a data flow) from said electronic device; and
- a determination module 22 configured to determine the operation of said electronic device based on the noise present in the received signal.

The signal received by the reception module 21 is transmitted by a transmission module of the electronic device that is configured to transmit, via a radio communication channel, a signal to a checking device 20.

According to some embodiments, the checking device may comprise:
- a generation module 23 configured to generate information relating to the operation of the electronic device; and/or
- a checking module 24 for checking the noise present in the received signal.

In one operating mode, the noise checking module is configured to check the noise in the received signal against a nominal noise associated with an operating mode of the electronic device, the signal received by the checking device corresponding to a signal that was transmitted by the electronic device operating in said operating mode.

In one operating mode, the noise checking module may be configured to check a characteristic of a noise representative of a malfunction of said electronic device.

The checking device may furthermore comprise a comparison module 25 configured to compare the noise present in said received signal and the nominal noise associated with the operating mode of the electronic device.

The determination module is designed to determine, based on the result of said comparison, whether the electronic device is operating correctly or whether it exhibits a malfunction.

In one operating mode, the device for determining the operation of the electronic device may comprise an analysis module configured to analyze the spectrum of the received signal.

In one operating mode, the comparison module comprises a checking module configured to check the similarity between said received signal and a nominal signal containing the nominal noise associated with the operating mode of the device.

In one operating mode, the checking device comprises a selection module 26 configured to select the similarity algorithm based on at least one characteristic of the nominal noise associated with the operating mode of the electronic device.

The abovementioned modules and means are driven by the processor of the processing unit 201. They may take the form of a program able to be executed by a processor, or a hardware form, such as an application-specific integrated circuit (ASIC), a system on chip (SoC), or a programmable logic circuit-type electronic component, such as an FPGA (for "field-programmable gate array") component.

The electronic device or object 10 also comprises a communication bus to which there are connected a processing unit or microprocessor, a non-volatile memory, a random access memory or RAM, and a communication interface designed in particular to exchange data with the checking device 20. The connected object 10 may for example send dedicated or non-dedicated signals to the checking device 20, which the checking device will use to determine whether the operation of the object is correct or incorrect by implementing the proposed checking method.

Furthermore, the connected object 10 may receive an initiation message from the checking device intended to trigger the implementation of the proposed checking method.

Although the present disclosure has been described with reference to one or more examples, workers skilled in the art will recognize that changes may be made in form and detail without departing from the scope of the disclosure and/or the appended claims.

The invention claimed is:

1. A checking method for checking operation of an electronic device configured to transmit signals via a radio communication channel when operating in a plurality of different operating modes, said checking method being implemented by a checking device and comprising:
  receiving, on said radio communication channel, a signal from the electronic device; and
  determining the operation of the electronic device by checking the received signal itself and noise present in the received signal, the noise being checked against a first noise associated with a first operating mode of the plurality of different operating modes of the electronic device implemented at a time of transmission of the signal.

2. The checking method as claimed in claim 1, wherein the checking method furthermore comprises generating information relating to the operation of the electronic device.

3. The checking method as claimed in claim 1, wherein checking the operation of the electronic device comprises comparing said noise present in said received signal and the first noise associated with the first operating mode of the electronic device, the determination of the operation being based on a result of said comparison.

4. The method as claimed in claim 3, wherein comparing the noise comprises checking similarity between said received signal and a first signal containing the first noise associated with the first operating mode of the electronic device.

5. The checking method as claimed in claim 4, wherein checking the similarity between said signals comprises implementing a similarity algorithm on the received and first signals.

6. The method as claimed in claim 5, wherein the algorithm that is implemented is selected based on at least one characteristic of the first noise associated with the first operating mode of the electronic device.

7. The checking method as claimed in claim 1, wherein checking the noise present in the received signal comprises checking a characteristic of a noise representative of a malfunction of said electronic device.

8. A checking device configured to check operation of an electronic device transmitting signals via a radio communication channel when operating in a plurality of different operating modes, the checking device comprising:
   a processor; and
   a non-transitory computer readable medium comprising instructions stored thereon which are executable by the processor and when executed configure the checking device to:
   receive, on said radio communication channel, a signal from said electronic device; and
   determine the operation of said electronic device by checking the received signal itself and noise present in the received signal, the noise being checked against a first noise associated with a first operating mode of the plurality of different operating modes of the electronic device implemented at a time of transmission of the signal.

9. An equipment configured to communicate with the electronic device via the radio communication channel, said equipment comprising the checking device as claimed in claim 8.

10. The checking device configured as claimed in claim 8, wherein checking the operation of the electronic device comprises comparing said noise present in said received signal and the first noise associated with the first operating mode of the electronic device, the determination of the operation being based on a result of said comparison.

11. The checking device configured as claimed in claim 10, wherein comparing the noise comprises checking similarity between said received signal and a first signal containing the first noise associated with the first operating mode of the electronic device.

12. The checking device configured as claimed in claim 11, wherein checking the similarity between said signals comprises implementing a similarity algorithm on the received and first signals.

13. The checking device configured as claimed in claim 12, wherein the algorithm that is implemented is selected based on at least one characteristic of the first noise associated with the first operating mode of the electronic device.

14. The checking method as claimed in claim 8, wherein checking the noise present in the received signal comprises checking a characteristic of a noise representative of a malfunction of said electronic device.

15. A non-transitory information medium comprising instructions stored thereon for executing a method of checking operation of an electronic device when the instructions are executed by a processor of a checking device, the electronic device being configured to transmit signals via a radio communication channel when operating in a plurality of different operating mode, wherein the method comprises:
   receiving, on said radio communication channel, a signal from the electronic device; and
   determining the operation of the electronic device by checking the received signal itself and noise present in the received signal, the noise being checked against a first noise associated with a first operating mode of the plurality of different operating modes of the electronic device implemented at a time of transmission of the signal.

16. The non-transitory information medium as claimed in claim 15, wherein checking the operation of the electronic device comprises comparing said noise present in said received signal and the first noise associated with the first operating mode of the electronic device, the determination of the operation being based on a result of said comparison.

17. The non-transitory information medium as claimed in claim 16, wherein comparing the noise comprises checking similarity between said received signal and a first signal containing the first noise associated with the first operating mode of the electronic device.

18. The non-transitory information medium as claimed in claim 17, wherein checking the similarity between said signals comprises implementing a similarity algorithm on the received and first signals.

19. The non-transitory information medium as claimed in claim 18, wherein the algorithm that is implemented is selected based on at least one characteristic of the first noise associated with the first operating mode of the electronic device.

20. The non-transitory information medium as claimed in claim 15 wherein checking the noise present in the received signal comprises checking a characteristic of a noise representative of a malfunction of said electronic device.

* * * * *